(12) United States Patent
Tsukamoto (10) Patent No.: US 10,815,054 B2
(45) Date of Patent: Oct. 27, 2020

(54) ARTICLE TRANSPORT APPARATUS (71) Applicant: Daifuku Co., Ltd., Osaka-shi (JP)

(72) Inventor: Kunihiro Tsukamoto, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 121 days.

(21) Appl. No.: 16/092,569

(22) PCT Filed: Apr. 10, 2017

(86) PCT No.: PCT/JP2017/014647
§ 371 (c)(1),
(2) Date: Oct. 10, 2018

(87) PCT Pub. No.: WO2017/179528
PCT Pub. Date: Oct. 19, 2017

(65) Prior Publication Data
US 2019/0119040 A1 Apr. 25, 2019

(30) Foreign Application Priority Data

Apr. 12, 2016 (JP) .................................. 2016-079547

(51) Int. Cl.
*B66F 9/07* (2006.01)
*B65G 1/04* (2006.01)

(52) U.S. Cl.
CPC ............. *B65G 1/0407* (2013.01); *B65G 1/04* (2013.01); *B66F 9/072* (2013.01); *B65G 2203/0266* (2013.01); *B65G 2203/045* (2013.01); *B66F 9/07* (2013.01)

(58) Field of Classification Search
CPC .... B66F 9/07; B66F 9/072; B66F 9/06; B66B 7/04; B66B 7/048; B66B 7/042; B65G 1/0407
See application file for complete search history.

(56) References Cited

U.S. PATENT DOCUMENTS

| | | | |
|---|---|---|---|
| 2,253,820 A * | 8/1941 | Spiro | ...................... B66B 7/046 |
| | | | 187/410 |
| 3,503,476 A | 3/1970 | Burch et al. | |
| 4,252,217 A | 2/1981 | Benjamin | |

FOREIGN PATENT DOCUMENTS

| | | |
|---|---|---|
| JP | 4910624 | 3/1974 |
| JP | 5834877 | 3/1983 |
| JP | 2003267517 A | 9/2003 |

\* cited by examiner

*Primary Examiner* — Timothy R Waggoner
(74) *Attorney, Agent, or Firm* — The Webb Law Firm (57) ABSTRACT

An article transport apparatus includes a mast provided upright on the traveling body, an upper frame (6) coupled to an upper end portion of the mast and an upper rail (R2) that guides movement of the upper frame (6). Separately from guide rollers disposed on lateral opposite sides of the upper rail (R2), a first roller (18A) and a second roller (18B) that are rotatable about vertical axes (P1, P2) are disposed on opposite sides of the upper rail (R2). A first supporting member (19) supporting the first roller (18A) is attached so as to be biased by a first biasing body (22) in a direction to push the first roller (18A) against the upper rail (R2), and a second supporting member (20) supporting the second roller (18B) is attached so as to be biased by a second biasing body (22) in a direction to push the second roller (18B) against the upper rail (R2).

11 Claims, 5 Drawing Sheets

ARTICLE TRANSPORT APPARATUS

CROSS-REFERENCE TO RELATED APPLICATIONS

This application is the United States national phase of International Application No. PCT/JP2017/014647 filed Apr. 10, 2017, and claims priority to Japanese Patent Application No. 2016-079547 filed Apr. 12, 2016, the disclosures of which are hereby incorporated in their entirety by reference.

BACKGROUND OF THE INVENTION

Field of the Invention

The present invention relates to an article transport apparatus including: a lower rail installed on a floor surface; a traveling body configured to be guided by the lower rail and to travel along the lower rail; a mast provided upright on the traveling body; an upper frame coupled to an upper end portion of the mast; an upper rail extending along a traveling direction of the traveling body and configured to guide movement of the upper frame; and an elevating body including a transfer device for transferring an article and configured to move up and down along the mast, the upper frame including at least two guide rollers with positions thereof relative to the upper frame being fixed, the guide rollers being disposed so as to be rotatable about vertical axes and separately on opposite sides of the upper rail as viewed in a vertical direction, and configured to be guided by the upper rail.

Description of Related Art

As an example of such an article transport apparatus, an article transport apparatus is disclosed in which a braking device including a rotary roller for braking is provided on an upper frame in addition to guide rollers in order to shorten the time in which the sway of the mast subsides when the traveling body is stopped (see e.g., paragraphs [0012] to [0018] and FIG. 3 of JP 2003-267517A (Patent Document 1).

The article transport apparatus of Patent Document 1 includes, as a braking device (50), a braking roller (23) and a guide roller (24) that are rotatable about vertical axes. The braking device (50) serves to lock an upper portion of each mast (1) to an upper rail (7) when an article transport apparatus (A) has stopped. The braking roller (23) is attached in a state in which the position of its rotation axis can be changed in a lateral direction that is orthogonal to the traveling direction in plan view and in which it is biased in a direction to be pushed against the upper rail (7) by a spring (25) serving as a biasing body. The guide roller (24) is attached in a state in which its rotation axis is fixed to the upper frame.

With this configuration, Patent Document 1 locks the upper portion of the mast (1) to the upper rail (7) after a truck (18) serving as a traveling body has been stopped, thereby shortening the time in which the sway of the mast subsides.

In the article transport apparatus of Patent Document 1, the braking device (50) is not operated during traveling of the article transport apparatus (A), and the braking roller (23) comes into light contact with the upper rail (7) against the force of the spring (25) so as to function as a guide roller. Accordingly, the upper portion of the article transport apparatus (A) is coupled to the upper rail (7) by a pair of guide rollers (9, 9), the braking roller (23), and the guide roller (24), and thereby, the article transport apparatus (A) including the upper frame travels along the upper rail (7) in a stable manner.

SUMMARY OF THE INVENTION

Meanwhile, as in the case of a large stacker crane having a high overall height, when the mast has a long overall length and a heavy weight, the range of sway of the upper end of the mast after the traveling body has been stopped is also large. Moreover, the moment of inertia of the mast and the upper frame coupled to thereto also becomes large.

The braking device (50) in the article transport apparatus of Patent Document 1 is configured to lock, to the upper rail (7), the upper portion of the mast (1) that is swaying after stoppage of the a truck (18) serving as the traveling body. Accordingly, in order to apply the technique of Patent Document 1 to the above-described large stacker crane, it is necessary to provide a braking device capable of generating a large braking force in order to deal with a large sway or moment of inertia of the mast. For that purpose, a braking apparatus having a large braking torque, such a powder brake, is required, and it is necessary to provide a robust mounting structure for the braking device, including, a support structure for the braking roller and the guide roller.

Therefore, there is a need for an article transport apparatus that can suppress, with a simple configuration, the sway of the mast after the traveling body has stopped.

A characteristic feature of an article transport apparatus in view of the above includes:

a lower rail installed on a floor surface;

a traveling body configured to be guided by the lower rail and to travel along the lower rail;

a mast provided upright on the traveling body;

an upper frame coupled to an upper end portion of the mast;

an upper rail extending along a traveling direction of the traveling body and configured to guide movement of the upper frame; and an elevating body including a transfer device for transferring an article and configured to move up and down along the mast, the upper frame including at least two guide rollers with positions thereof relative to the upper frame being fixed, the guide rollers being disposed so as to be rotatable about vertical axes and separately on opposite sides of the upper rail as viewed in a vertical direction, and configured to be guided by the upper rail, wherein a first roller and a second roller that are rotatable about vertical axes are disposed opposite to each other with respect to the upper rail in a lateral direction that is orthogonal to the traveling direction as viewed in the vertical direction, a first supporting member configured to rotationally support the first roller is attached in a state in which a position of a rotation axis of the first roller can be changed in the lateral direction and in which the first supporting member is biased by a first biasing body in a direction to push the first roller against the upper rail, and a second supporting member configured to rotationally support the second roller is attached in a state in which a position of a rotation axis of the second roller can be changed in the lateral direction and in which the second supporting member is biased by a second biasing body in a direction to push the second roller against the upper rail.

Since the traveling body travels in a state in which the position of the upper frame is restricted relative to the upper rail by the at least two guide rollers whose rotation axes are attached to the upper frame in a fixed state being guided by the upper rail, the first roller and the second roller that roll on the upper rail at different positions from the two guide rollers in the traveling direction will roll on the upper rail while their positions relative to the upper rail in the lateral direction fluctuate during traveling. Here, possible causes of the changes in the positions of the first roller and the second roller relative to the upper rail in the lateral direction include gaps that can be present between the guide rollers and the upper rail, vibrations of the mast in the lateral direction, manufacturing errors in linearity of the apparatus such as the upper frame and the upper rail, and errors in assembly of the apparatus.

In this respect, according to the present characteristic feature, the first roller and the second roller are both attached in a state in which their positions can be changed in the lateral direction and in which they are biased in a direction to be pushed against the upper rail. Therefore, even when the positions, in the lateral direction, of the first roller and the second roller relative to the upper rail fluctuate during traveling of the traveling body, the positions in the lateral direction can be changed such that the first roller and the second roller follow the upper rail, and thereby, the first roller and the second roller roll on the upper rail in a state in which they are appropriately pressed from opposite sides relative to the upper rail. Accordingly, a braking force exerted on the upper portion of the mast, such as a braking force resulting from the rotational resistances of the first roller and the second roller or a braking force resulting from the braking torque in the case of providing a braking apparatus can be generated in a stable manner during traveling. The braking force exerted on the upper portion of the mast during traveling suppresses elastic deformation of the mast in which the mast is tilted in the advancing direction during deceleration of the traveling body, thus making it possible to suppress the sway of the mast after the traveling body has stopped.

Thus, by the traveling body traveling in a state in which the braking force of the first roller and the second roller is generated, it is possible to restrict elastic deformation of the mast in the traveling direction occurring during deceleration, while allowing movement of the upper portion of the mast relative to the upper rail. Since the braking force of the first roller and the second roller is a braking force of a degree which allows movement relative to the upper rail, the braking force of the first roller and the second roller can be smaller than in the case where the sway of the mast is rapidly restricted by a large braking force after the traveling body has stopped.

Accordingly, the support structures for the first roller and the second roller can be simplified. Even in the case of providing a braking apparatus, it is only necessary to provide a braking apparatus having a relatively small braking torque. It is thus possible to achieve an article transport apparatus that can suppress, with a simple configuration, the sway of the mast after stoppage of the traveling body.

Further features and advantages of the article transport apparatus will become apparent from the following description of exemplary embodiments with reference to the attached drawings.

DESCRIPTION OF THE INVENTION

First Embodiment

Figure 1:
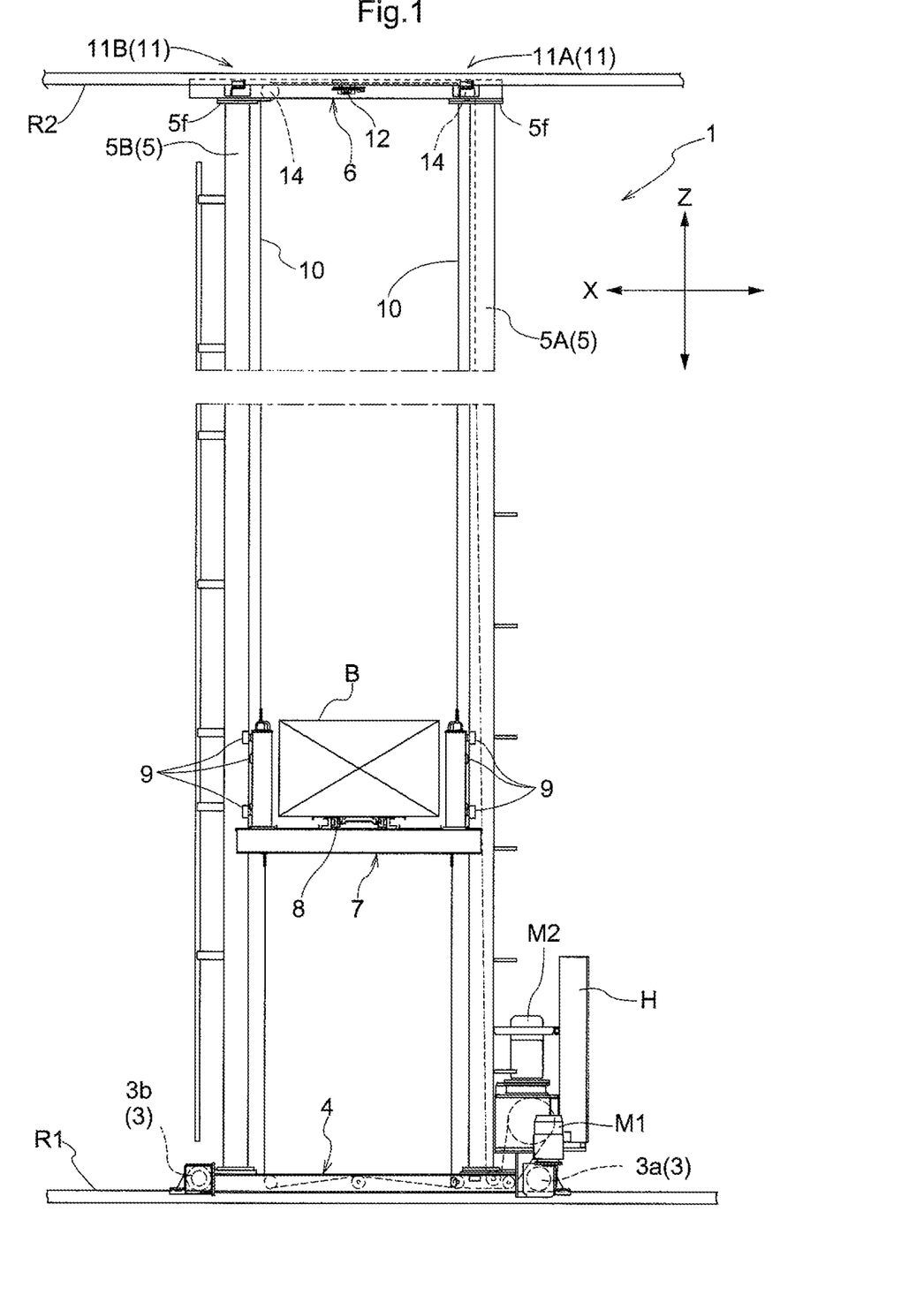
FIG. 1 is an overall side view of a stacker crane according to a first embodiment.

A first embodiment of the article transport apparatus will be described with reference the drawings. As shown in FIG. 1, an article transport apparatus of the present embodiment includes a stacker crane 1 that travels by being guided by a lower rail R1 installed on a floor surface and extending linearly, and an upper rail R2 disposed parallel to the lower rail R1 and extending linearly.

The stacker crane 1 includes: a traveling body 4 that supports traveling wheels 3 that roll on the lower rail R1; a pair of masts 5 (a first mast 5A and a second mast 5B) that are spaced apart from each other in a traveling direction (the direction indicated by X in FIG. 1; hereinafter referred to as "traveling direction X") above the traveling body 4 and provided upright along an vertical direction (the direction indicated by Z in FIG. 1; hereinafter referred to as "vertical direction Z"); an upper frame 6 that connects the upper end portions of the first mast 5A and the second mast 5B to each other; and an elevating body 7 that is driven to move up and down in a suspended state by a pair of drive chains 10 and moves up and down along an elevation path located between the pair of masts 5.

As the traveling wheels 3 included in the traveling body 4, a travel driving wheel 3a driven by a traveling motor M1 and a following wheel 3b that is freely rotatable are provided at a front end portion and a rear end portion of the traveling body 4. The elevating body 7 is provided with a transfer device 8 that transfers an article B to be transported to and from a transfer target location. The transfer device 8 moves the article B to be transported by extending and retracting an article supporting portion that supports the article B to be transported, in a direction (the direction through the plane of the paper in FIG. 1; hereinafter referred to as "lateral direction Y) that is orthogonal to the traveling path in plan view, thereby delivering and receiving the article B to and from the transfer target location. In the present embodiment, the transfer device 8 is constituted by a fork-type transfer device including an article supporting portion on which the article B is placed such that the article supporting portion is extendable and retractable. As the transfer target location, for example, storage sections in article storage racks disposed on opposite sides of the traveling path of the stacker crane 1 in the lateral direction Y, a delivery/reception location for storage and retrieval that is provided outward of an end portion of the article storage rack in the traveling direction X may be set.

Each of the pair of masts 5 is formed as a vertically elongated, hollow rectangular pipe. Three outer side surfaces of the four outer side surfaces of each of the first mast 5A and the second mast 5B form a guide surface that guides ascending and descending of the elevating body 7. That is, each of the first mast 5A and the second mast 5B includes a pair of guide surfaces extending along the vertical direction Z and facing mutually opposite directions, and a guide surface facing the direction in which the elevating body 7 is present in the traveling direction X. In a state in which a plurality of elevation guide rollers 9 included in the elevating body 7 are guided by the three guide surfaces of the first mast 5A and the three guide surfaces of the second mast 5B, the drive chains 10 are operated to be wound by an elevation motor M2, and thereby, the elevating body 7 moves up and down along the masts 5.

In this manner, the article transport apparatus of the present embodiment includes the traveling body 4 that travels along the lower rail R1 by being guided by the lower rail R1 installed on a floor surface, the masts 5 provided upright on the traveling body 4, the upper frame 6 coupled to the upper end portions of the masts 5, the upper rail R2 that extends along the traveling direction X of the traveling body 4 and guides the movement of the upper frame 6, and the elevating body 7 that includes the transfer device 8 that transfers the article B and moves up and down along the masts 5. Note that the upper rail R2 is supported, for example, by a plurality of supporting members provided at an upper end of a single article storage rack disposed at a side portion of the traveling path of the traveling body 4 or a pair of article storage racks disposed across the traveling path.

With this configuration, the stacker crane 1 handles a transport operation of receiving an article B to be transported at the transfer target location of the transport source and delivering the article B to be transported to the transfer target location of the transport destination, by using a combination of the traveling operation of the traveling body 4, the ascending/descending operation of the elevating body 7, and the transfer operation of the transfer device 8. Note that the traveling operation of the traveling body 4, the ascending/descending operation of the elevating body 7, and the transfer operation of the transfer device 8 are controlled by a control portion H.

In the stacker crane 1 of the present embodiment, the upper frame 6 is provided with a braking unit 12 in order to suppress vibrations along the traveling direction X of the upper frame 6 that are caused by elastic deformation of the masts 5 in the traveling direction X that occurs during deceleration of the traveling body 4 in the transport operation.

Figure 2:
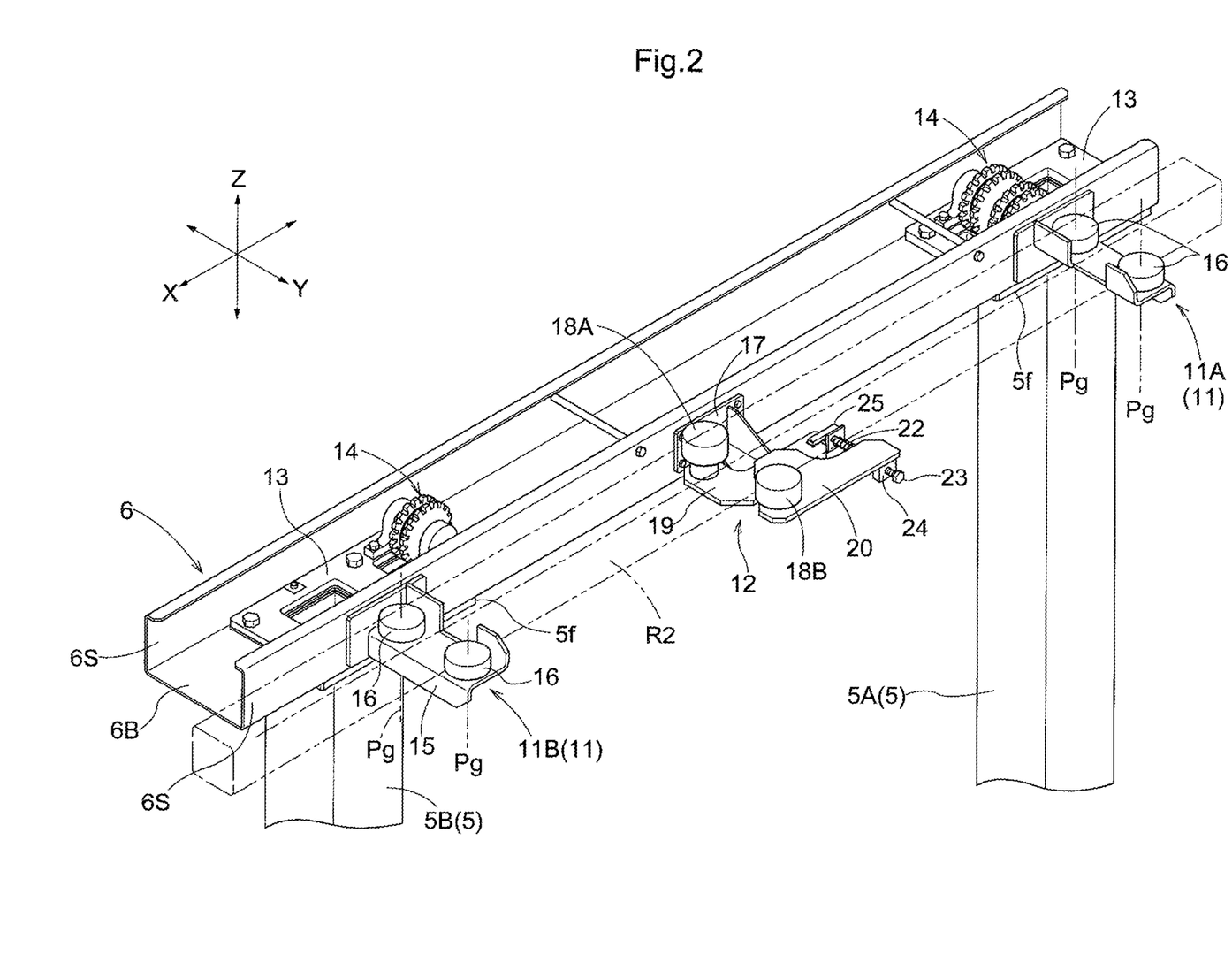
FIG. 2 is an enlarged perspective view showing an upper portion of the stacker crane according to the first embodiment.

As shown in FIG. 2, the upper frame 6 includes a pair of guide units 11 (a first guide unit 11A and a second guide unit 11B) in the traveling direction X in a distributed manner, and includes a braking unit 12 at a position interposed between the pair of guide units 11 in the traveling direction X. The first guide unit 11A is provided at a position corresponding to the first mast 5A in the traveling direction X, and the second guide unit 11B is provided at a position corresponding to the second mast 5B in the traveling direction X. The braking unit 12 is provided at a position intermediate between the first mast 5A and the second mast 5B in the traveling direction X.

The upper frame 6 includes a bottom portion 6B to which a flange portion 5f formed at an upper end portion of each of the pair of masts 5 is fixed with a bolt via a mounting plate 13, and a lateral pair of side portions 6S extending upward along the vertical direction Z respectively from opposite end edges of the bottom portion 6B in the lateral direction Y.

Additionally, an upper idler 14 is rotatably supported by each of the mounting plates 13.

Each guide unit 11 is attached with a bracket 15 to a side portion 6S of the upper frame 6. Each bracket 15 supports a pair of guide rollers 16 disposed on opposite sides of the upper rail R2 in the lateral direction Y in a state in which the guide rollers are arranged in the lateral direction Y and rotatable about vertical axes Pg. In the present embodiment, on the basis of the length of the upper rail R2 in the lateral direction Y and the diameter of the guide rollers 16, the arrangement pitch between the pair of guide rollers 16 is set to a defined value at which a gap of several millimeters (e.g., 1.5 mm) is formed between the outer circumferential surface of each guide roller 16 and the guide surface of the upper rail R2. Here, when the pair of guide rollers 16 are installed according to a value of the arrangement pitch defined for design purposes, the guide rollers 16 may be brought into a state in which they are pressed against the upper rail R2, depending on the production precision or the like of the upper frame 6 and the upper rail R2. However, the above-described defined value is adjusted to a distance at which each guide roller 16 is pushed against the upper rail R2 in the lateral direction Y by a force less than or equal to an allowable pressing force (in the present embodiment, 150 [Kgf]) even in such a case.

Thus, the upper frame 6 of the article transport apparatus according to the present embodiment includes, at opposite end portions in the traveling direction X in a distributed manner, two sets of two guide rollers 16 that are rotatable about the vertical axes Pg and are guided by the upper rail R2 in a state in which their positions relative to the upper frame 6 are fixed. The two guide rollers 16 of each set are disposed separately on opposite sides of the upper rail R2 in the lateral direction Y that is orthogonal to the traveling direction X in plan view.

The braking unit 12 provided between the first guide unit 11A and the second guide unit 11B includes a first roller 18A and a second roller 18B that are rotatable about the vertical axes in a state in which the first roller 18A and the second roller 18B are pushed against the upper rail R2 with the same pressing force at the same position in the traveling direction X from mutually opposite directions relative to the upper rail R2. Here, in the following, this will be described in detail.

Figure 4:
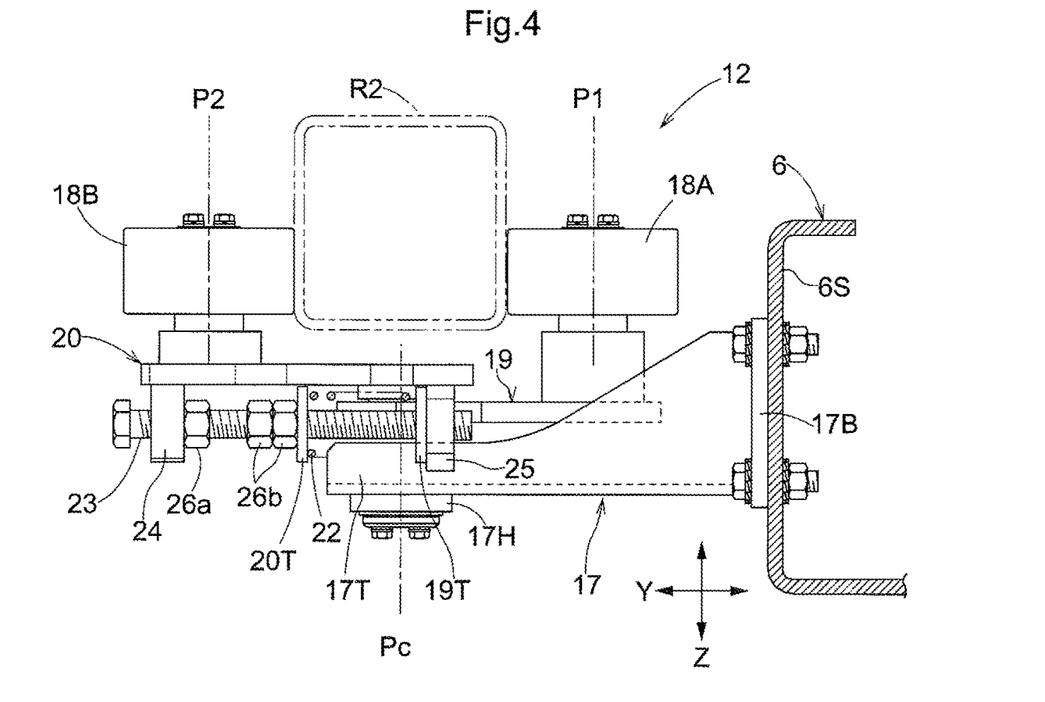
FIG. 4 is an enlarged front view of the upper portion of the stacker crane according to the first embodiment.

As shown in FIGS. 2 and 4, the braking unit 12 is attached in an orientation in which it protrudes from the upper frame 6 in the lateral direction Y. A base portion 17B of a mounting bracket 17 that is elongated in the lateral direction Y is attached to a side portion 6S of the upper frame 6, and a tip portion 17T of the mounting bracket 17 that is located opposite to the base portion 17B in the lateral direction Y protrudes to a position directly below the upper rail R2.

At the tip portion 17T of the mounting bracket 17, a first supporting member 19 that supports the first roller 18A so as to be rotatable about a first vertical axis P1 and a second supporting member 20 that supports the second roller 18B so as to be rotatable about a second vertical axis P2 are provided such that the first supporting member 19 and the second supporting member 20 are separately pivotable about a common axis Pc.

The first supporting member 19 and the second supporting member 20 are each formed of a plate-shaped member extending along a horizontal plane. Although the detailed illustration has been omitted, the first supporting member 19 includes a boss portion bulging from its lower surface, and the second supporting member 20 includes a pin portion protruding downward from its lower surface. The boss portion of the first supporting member 19 is rotatably fitted via a bearing to a vertically penetrating boss portion 17H formed in the tip portion 17T of the mounting bracket 17, and the pin portion of the second supporting member 20 is rotatably fitted via a bearing to the boss portion of the first supporting member 19. Then, the axes of the boss portion 17H of the mounting bracket 17, the boss portion of the first supporting member 19, and the pin portion of the second supporting member 20 are disposed so as to coincide with the common axis Pc located on a virtual center line 21 forming the center of the upper rail R2 in the lateral direction Y. Thereby, the first supporting member 19 and the second supporting member 20 are separately pivotable about the common axis Pc relative to the mounting bracket 17.

Thus, in the article transport apparatus according to the present embodiment, the first supporting member 19 is supported by the upper frame 6 so as to be pivotable about the pivot axis (common axis Pc) extending along the vertical direction, and the second supporting member 20 is supported by the upper frame 6 so as to be pivotable about the pivot axis (common axis Pc) extending along the vertical direction. Then, the common axis Pc is located on the virtual center line 21 forming the center of the upper rail R2 in the lateral direction Y as viewed in the vertical direction.

Figure 3:
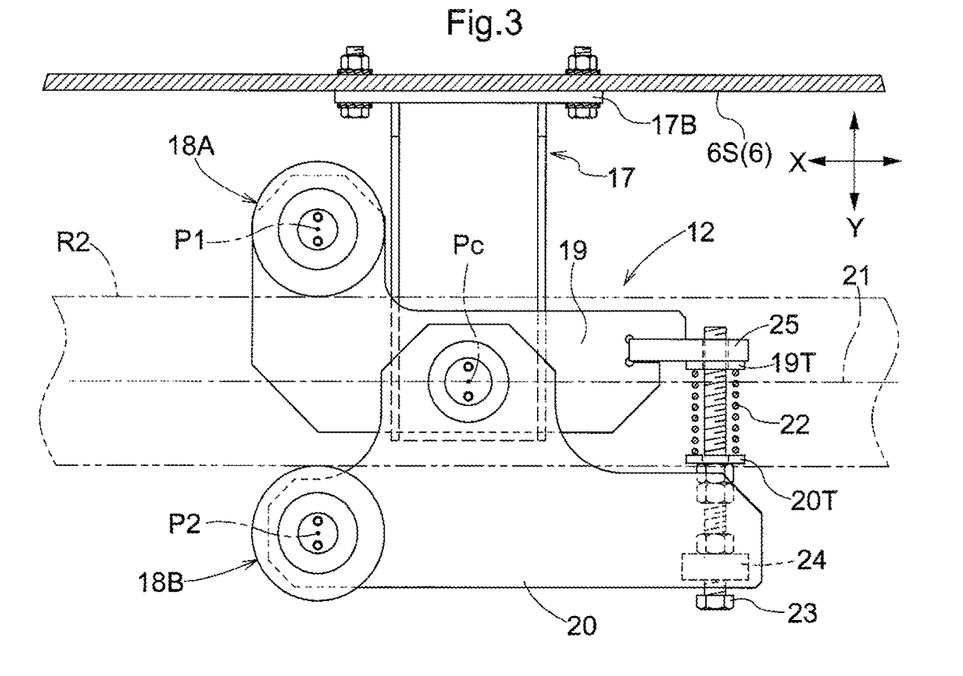
FIG. 3 is a plan view of a braking unit according to the first embodiment.

As shown in FIGS. 3 and 4, between a first spring receiving plate 19T that is provided in the first supporting member 19 at a position opposite to the first roller 18A in the traveling direction X and a second spring receiving plate 20T that is provided in the second supporting member 20 at a position opposite to the second roller 18B in the traveling direction X, a coil spring 22 in a compressed state is disposed in a state in which it is externally fitted to a bolt 23 having an axis extending along the lateral direction Y. Although not shown, a through hole having a diameter that is larger than the outer diameter of the thread portion of the bolt 23 and is smaller than the inner diameter of coil spring 22 is formed in each of the first spring receiving plate 19T and the second spring receiving plate 20T.

The second supporting member 20 is provided with a bolt support member 24 including a threadably engaging hole with which a proximal end portion of the bolt 23 is threadably engaged. The movement, relative to the bolt support member 24, of the bolt 23 supported by the bolt support member 24 is restricted by tightening a bolt position setting nut 26a that is threadably engaged with the bolt 23 on the distal end side relative to the bolt support member 24. On the distal end side of the bolt 23 relative to the nut 26a, a pressing force adjusting double nut 26b for adjusting the pressing force of the coil spring 22 is provided. Since the movement of the second spring receiving plate 20T to the proximal end side is restricted by the double nut 26b, the pressing force of the coil spring 22 that is input to the second spring receiving plate 20T is received by the double nut 26b, and the pressing force is transmitted to the second supporting member 20 via the bolt support member 24.

The first supporting member 19 is provided with a first spring receiving plate 19T having an insertion hole through which the tip portion of the bolt 23 is inserted so as be movable in a state in which a gap is formed around its circumference, and a bolt insertion body 25 that supports the first spring receiving plate 19T. The bolt insertion body 25 is in surface contact with the first spring receiving plate 19T, and the pressing force of the coil spring 22 that is input to the first spring receiving plate 19T is transmitted to the first supporting member 19 via the bolt insertion body 25. Note that the insertion holes formed in the first spring receiving plate 19T and the bolt insertion body 25 have such a diameter size that the tip portion of the bolt 23 supported by the second supporting member 20 will not interfere with the first spring receiving plate 19T and the bolt insertion body 25 when the first supporting member 19 and the second supporting member 20 are pivoted relative to each other about the common axis Pc.

With such a configuration, the coil spring 22 in a compressed state that is disposed between the first spring receiving plate 19T and the second spring receiving plate 20T presses the first spring receiving plate 19T and the second spring receiving plate 20T such that they are spaced apart in the lateral direction Y. As a result, the direction of force is reversed in plan view with the common axis Pc as a fulcrum, and the first roller 18A and the second roller 18B are pushed against the upper rail R2 by a force in the direction in which they move close to each other along the lateral direction Y.

That is, in the article transport apparatus of the present embodiment, the first supporting member 19 is biased in a direction to rotate counterclockwise about the common axis Pc in FIG. 3 by the elastic deformation force of the coil spring 22, and the second supporting member 20 is biased in a direction to rotate clockwise about the common axis Pc in FIG. 3. Consequently, the first roller 18A is pushed downward against the upper rail R2 in FIG. 3, and the second roller 18B is pushed upward against the upper rail R2 in FIG. 3. Both the first supporting member 19 and the second supporting member 20 can pivot about the common axis Pc such that the pressing force of the first roller 18A and the pressing force of the second roller 18B are brought into balance, and therefore, the state in which their pressing forces are in balance can be maintained.

Figure 5:
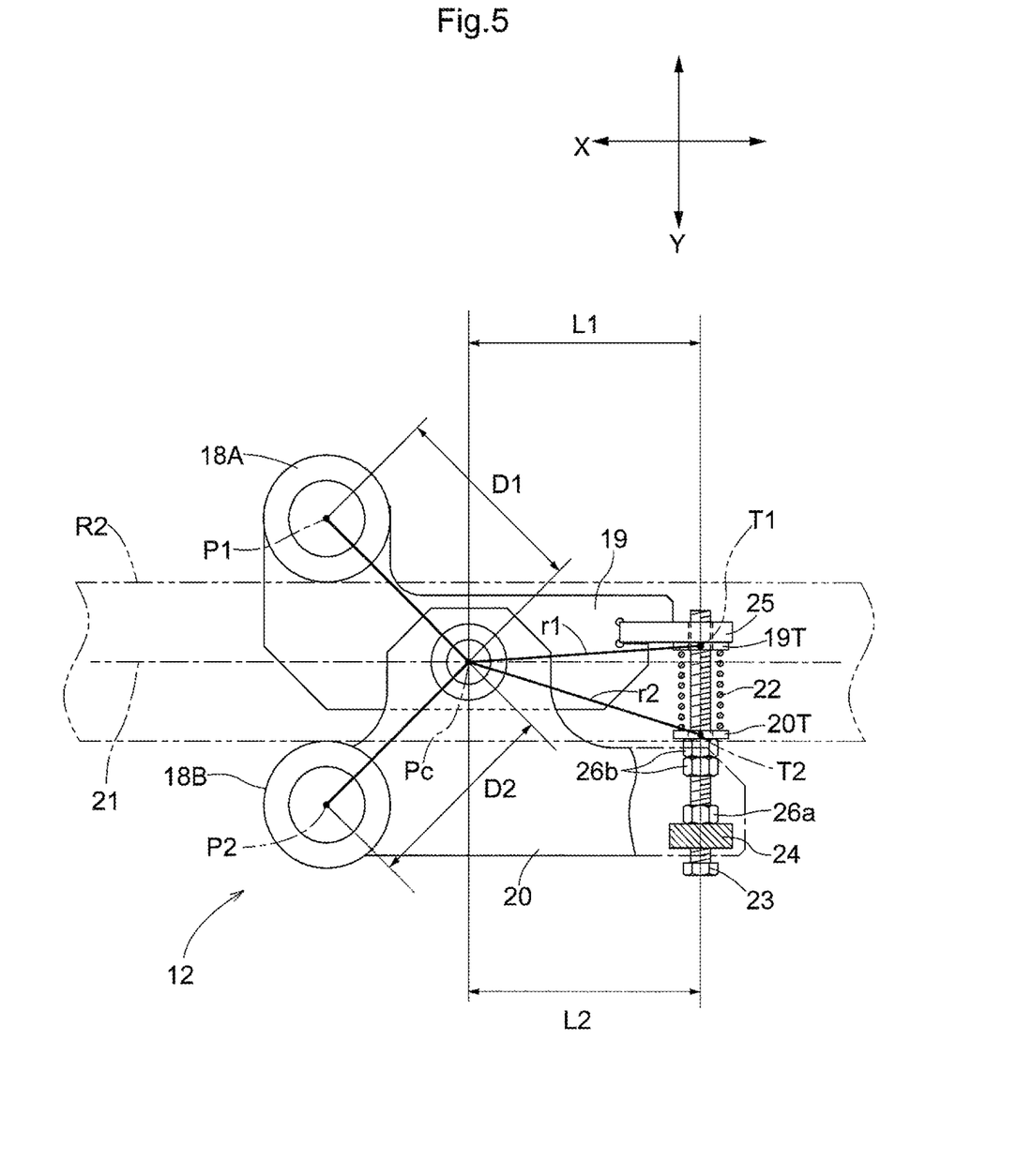
FIG. 5 is a plan view showing a braking force transmission model of the braking unit according to the first embodiment.

As shown in FIG. 5, the coil spring 22 that is an elastic body serving as the first biasing body and the second biasing body is disposed in a compressed state between a first force point T1 in the first supporting member 19 and a second force point T2 in the second supporting member 20, the first force point T1 being located on the same side as the first roller 18A with respect to the virtual center line 21 in the lateral direction Y and opposite to the first roller 18A with respect to the common axis Pc in the traveling direction X, and the second force point T2 being located on the same side as the second roller 18B with respect to the virtual center line 21 in the lateral direction Y and opposite to the second roller 18B with respect to the common axis Pc in the traveling direction X. Furthermore, in a state in which the first supporting member 19 and the second supporting member 20 are in a reference orientation, a distance L1 from the common axis Pc to the first force point T1 in the traveling direction X and a distance L2 from the common axis Pc to the second force point T2 in the traveling direction X are equal. The reference orientation refers to an orientation in which the axis of the bolt 23 supported by the second supporting member 20 and the axis of the bolt insertion hole of the bolt insertion body 25 of the first supporting member 19 are both extend along the lateral direction Y.

In addition, a distance D1 from the common axis Pc to the rotation axis (first vertical axis P1) of the first roller 18A and a distance D2 from the common axis Pc to the rotation axis (second vertical axis P2) of the second roller 18B are equal as viewed in the vertical direction Z. In the reference orientation, a distance r1 from the common axis Pc to the first force point T1 and a distance r2 from the common axis Pc to the second force point T2 as viewed in the vertical direction Z are slightly different, and therefore, the first supporting member 19 and the second supporting member 20 are both pivoted slightly (by about 1 to 3 degrees) about the common axis Pc from the reference orientation such that the pressing force of the first roller 18A and the pressing force of the second roller 18B are brought into balance.

As described thus far, in the article transport apparatus according to the present embodiment, a first supporting member 19 that rotationally supports the first roller 18A is attached in a state in which a position of the rotation axis (first vertical axis P1) of the first roller 18A can be changed in the lateral direction Y and in which the first supporting member 19 is biased by a coil spring 22 serving as a first biasing body in a direction to push the first roller 18A against the upper rail R2, and a second supporting member 20 that rotationally supports the second roller 18B is attached in a state in which a position of the rotation axis (second vertical axis P2) of the second roller 18B can be changed in the lateral direction Y and in which the second supporting member 20 is biased by a coil spring 22 serving as a second biasing body in a direction to push the second roller 18B against the upper rail R2. That is, in the present embodiment, the first pivot axis of the first supporting member 19 and the second pivot axis of the second supporting member 20 are a common axis Pc located on a virtual center line 21 forming a center, in the lateral direction Y, of the upper rail R2 as viewed in the vertical direction Z, and one coil spring 22 is used as both the first biasing body and the second biasing body.

As described above, by changing the threadable engagement position of the pressing force adjusting double nut 26b threadably engaged with the bolt 23, it is possible to change the interval between the first spring receiving plate 19T and the second spring receiving plate 20T located at opposite ends of the coil spring 22, thus changing the compression state of the coil spring 22. This makes it possible to adjust the pressing force of the first roller 18A and the pressing force of the second roller 18B, thus adjusting the braking force of the braking unit 12 to an appropriate braking force. That is, in the article transport apparatus of the present embodiment, one adjustment mechanism is used as both a first adjustment mechanism for adjusting the biasing force of the first biasing body for the first supporting member 19, and a second adjustment mechanism for adjusting the biasing force of the second biasing body for the second supporting member 20.

Here, the appropriate braking force is preferably a braking force with which the upper portion of each mast 5 can be appropriately braked during traveling within the range in which the stress generated at the lower end portion of the mast 5 will not be excessively increased. In the present embodiment, the pressing force of the first roller 18A and the pressing force of the second roller 18B are set within a range of 300 to 350 [Kgf] such that the braking force of the braking unit 12 is such an appropriate braking force, taking into consideration the coefficient of friction between the upper rail R2 and an urethane layer on the outer circumferential surface of the first roller 18A and the second roller 18B, the weight and the rigidity of the mast 5, and so forth.

Thus, in the article transport apparatus of the present embodiment, the pressing forces (300 to 350 [Kgf]) of the first roller 18A and the second roller 18B included in the braking unit 12 to the upper rail R2 are set to be greater than the allowable pressing force (150 [Kgf]) of the pair of guide rollers 16 included in the guide unit 11 to the upper rail R2.

Since the first supporting member 19 and the second supporting member 20 can be both pivoted about the common axis Pc such that the pressing force of the first roller 18A and the pressing force of the second roller 18B are brought into balance, and therefore, the state in which their pressing forces are in balance can be maintained. Accordingly, the state in which the first roller 18A and the second roller 18B are pressed against the upper rail R2 in a well-balanced manner can be maintained, and therefore, as long as the traveling conditions (speed as well as acceleration and deceleration) of the traveling body 4 are the same, the same braking force can be obtained by the braking unit 12 even when the positions of the traveling body 4 in the traveling direction X are different. Accordingly, the adjustment operation for the braking unit 12 can be readily performed so as to adjust the pressing force to a pressing force for achieving an appropriate braking force.

Then, the braking force of the braking unit 12 that is exerted on the upper portion of the mast is obtained in a stable manner during traveling of the traveling body 4, and thereby, elastic deformation of the masts 5 that would cause the mast 5 to be tilted in the advancing direction during deceleration of the traveling body 4 can be suppressed to suppress the sway of the mast 5 after the traveling body 4 has stopped, making it possible to perform transfer of the article B by the transfer device 8 promptly after the stoppage of the traveling body 4.

Second Embodiment

A second embodiment of the article transport apparatus will be described with reference to FIGS. 6 and 7. The present embodiment is different from the first embodiment described above in that a rotational resistance imparting device 40 is provided in a braking unit 12. The following description is focused on the difference between the article transport apparatus of the present embodiment and that of the first embodiment. The components that are not specifically described are the same as those of the first embodiment, and are denoted by the same reference numerals, with the detailed description thereof omitted.

Figure 6:
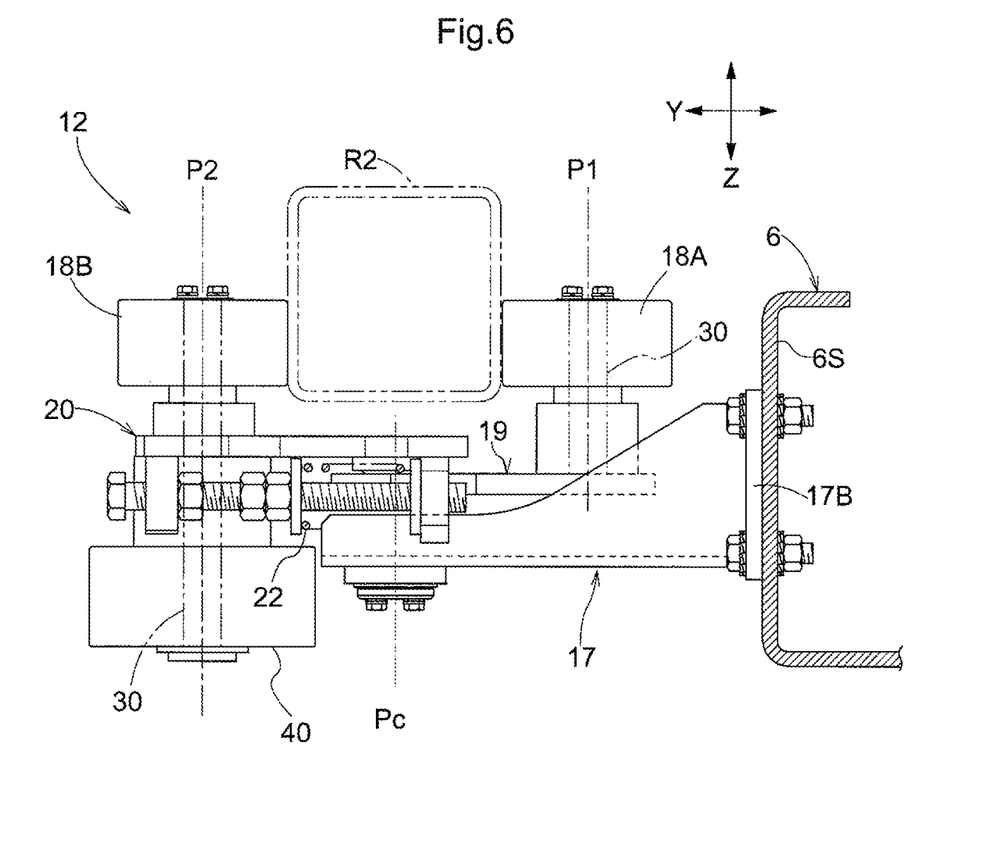
FIG. 6 is an enlarged front view showing an upper portion of a stacker crane according to a second embodiment.

As shown in FIG. 6, a braking unit 12 according to the present embodiment is configured by adding, to the braking unit 12 (see FIG. 4) according to the first embodiment described above, a rotational resistance imparting device 40 that imparts a rotational resistance. The rotational resistance imparting device 40 is provided on a rotation shaft 30 of at least one of a first roller 18A and a second roller 18B. In the example shown in FIG. 6, the rotational resistance imparting device 40 is provided on a rotation shaft 30 of the second roller 18B, and a rotational resistance is imparted to the second roller 18B (the rotation shaft 30 of the second roller 18B) by the rotational resistance imparting device 40. Although not shown, it is possible to adopt a configuration in which the rotational resistance imparting device 40 is provided on the rotation shaft 30 of the first roller 18A, or a configuration in which the rotational resistance imparting device 40 is provided on both the rotation shafts 30 of the first roller 18A and the second roller 18B.

As shown in FIG. 6, the rotational resistance imparting device 40 is fixed to a second supporting member 20 that rotationally supports the second roller 18B. The second roller 18B and the rotational resistance imparting device 40 are disposed on opposite to each other across the second supporting member 20 in the vertical direction Z, and the rotation shaft 30 of the second roller 18B is disposed extending through the second supporting member 20 in the vertical direction Z into the rotational resistance imparting device 40. The rotational resistance imparting device 40 imparts a rotational resistance to the rotation shaft 30 (achieves a braking force for the rotation shaft 30) by converting the kinetic energy of the rotation shaft 30 into another energy.

In the present embodiment, a device that converts the kinetic energy of the rotation shaft 30 into thermal energy is used as the rotational resistance imparting device 40. Examples of such a rotational resistance imparting device 40 include a device that uses a magnet to impart a rotational resistance to the rotation shaft 30, and a device that uses a frictional force (e.g., contact friction or fluid viscous friction) to impart a rotational resistance to the rotation shaft 30. Although the details are omitted, the device that uses a magnet to impart a rotational resistance to the rotation shaft 30 has a structure in which a rotational body coupled to the rotation shaft 30 is rotated in a magnetic field formed by the magnet (e.g., permanent magnet). Then, as the rotation shaft 30 is rotated, an eddy current is generated in the rotational body. Consequently, a force acting in the direction to stop the rotation (braking force) is exerted on the rotation shaft 30 by the interaction between the eddy current and the magnetic field of the magnet, and heat is generated in the rotational body.

The rotational resistance imparting device 40 is not configured to be able to switch whether or not to impart a rotational resistance according to the traveling state of the traveling body 4, and, instead, is configured to constantly impart a rotational resistance to the rotation shaft 30 during traveling (i.e., during rotation of the rotation shaft 30) of the traveling body 4. Accordingly, the pressing force of the first roller 18A and the second roller 18B against the upper rail R2, which is required to achieve the desired amount of the braking force with the rotational resistance provided by the first roller 18A and the second roller 18B, can be suppressed to be smaller than that required when the rotational resistance imparting device 40 is not provided in the braking unit 12. That is, although it is necessary to ensure the pressing force of the first roller 18A and the second roller 18B against the upper rail R2 at least in an amount sufficient to prevent the first roller 18A and the second roller 18B from being slid relative to the upper rail R2, the pressing force of the first roller 18A and the second roller 18B against the upper rail R2 can be reduced by an amount of the rotational resistance of at least one of the first roller 18A and the second roller 18B that has been increased by the rotational resistance imparting device 40. As a result, it is possible to reduce the weight of the braking unit 12 by reducing the size of the first biasing body and the second biasing body (the coil spring 22 in the present embodiment) and simplifying the support structure for the first roller 18A and the second roller 18B, and to increase the service life of the braking unit 12 by suppressing a decrease in service life of the various parts.

Meanwhile, when the device that converts the kinetic energy of the rotation shaft 30 into thermal energy is used as the rotational resistance imparting device 40 in this way, the amount of heat generation of the rotational resistance imparting device 40 may significantly exceed the amount of heat dissipation of the rotational resistance imparting device 40, depending on the traveling state of the traveling body 4. An excessive increase in the temperature of the rotational resistance imparting device 40 may cause a reduction in the durability and the performance of the parts constituting the rotational resistance imparting device 40 (e.g., a damage to the bearing caused by overheating, and demagnetization of the magnet). In view of this, in the present embodiment, the control portion H that controls the traveling operation of the traveling body 4 is configured to monitor the temperature of the rotational resistance imparting device 40, and, if it is determined that the temperature of the rotational resistance imparting device 40 is in a high-temperature state exceeding a predetermined threshold, limit the upper-limit traveling speed of the traveling body 4 to be lower than the upper-limit traveling speed of the traveling body 4 in a normal state that is not the high-temperature state. Since the amount of heat generation of the rotational resistance imparting device 40 generally increases with an increase in the traveling speed of the traveling body 4, the control portion H configured in this manner makes it possible to suppress a further increase in the temperature of the rotational resistance imparting device 40 in a situation in which the temperature of the rotational resistance imparting device 40 exceeds a predetermined threshold, thus avoiding an excessive increase in the temperature of the rotational resistance imparting device 40.

Figure 7:
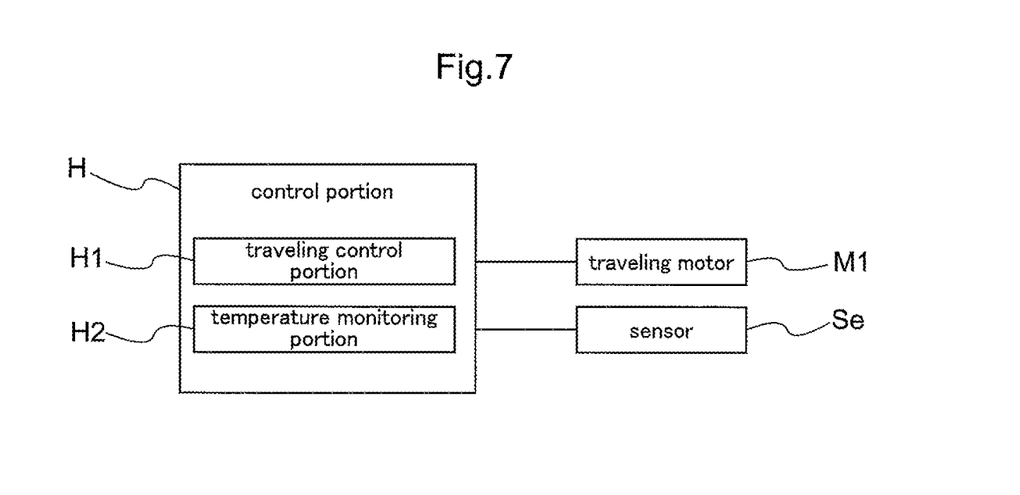
FIG. 7 is a control block diagram according to the second embodiment.

Specifically, as shown in FIG. 7, the control portion H includes a traveling control portion H1 and a temperature monitoring portion H2. The traveling control portion H1 is a functional portion that controls the traveling operation of the traveling body 4 by controlling the driving of a traveling motor M1, and the temperature monitoring portion H2 is a functional portion that monitors the temperature of the rotational resistance imparting device 40. The temperature monitoring portion H2 directly or indirectly monitors the temperature of the rotational resistance imparting device 40, based on detection information from a sensor Se. Then, the temperature monitoring portion H2 determines whether the temperature of the rotational resistance imparting device 40 exceeds the predetermined threshold (i.e., determines whether the temperature is in the high-temperature state), and outputs information indicating a result of the determination to the traveling control portion H1.

For example, it is possible to adopt a configuration in which a temperature sensor that detects the temperature of the rotational resistance imparting device 40 is provided as the sensor Se, and the temperature monitoring portion H2 directly monitors the temperature of the rotational resistance imparting device 40. It is also possible to adopt a configuration in which a sensor (e.g., a rotary encoder) that has been already provided to control the traveling operation of the traveling body 4 is used as the sensor Se, and the temperature monitoring portion H2 indirectly monitors the temperature of the rotational resistance imparting device 40. In this case, the temperature monitoring portion H2 monitors a physical quantity correlated with the temperature of the rotational resistance imparting device 40, and determines whether the temperature is in the high-temperature state based on the physical quantity. Examples of such a physical quantity include the rotational speed of the rotation shaft 30 and the traveling distance of the traveling body 4 within a certain period of time (or within one cycle). Since the amount of heat generation of the rotational resistance imparting device 40 increases with an increase in the rotational speed of the rotation shaft 30, the rotational speed of the rotation shaft 30 can be considered as a physical quantity correlated with the temperature of the rotational resistance imparting device 40. Since the average traveling speed of the traveling body 4 and the amount of heat generation of the rotational resistance imparting device 40 increase with an increase in the traveling distance within a certain period of time (or within one cycle), the traveling distance within a certain period of time (or within one cycle) can also be considered as a physical quantity correlated with the temperature of the rotational resistance imparting device 40. Here, "one cycle" means a transport cycle of the article B. For example, one reciprocal traveling operation of the traveling body 4 between the above-described delivery/reception location and a storage section to be transferred can be defined as one cycle.

When the temperature sensor that detects the temperature of the rotational resistance imparting device 40 is not provided, it is also possible to adopt a configuration in which the temperature monitoring portion H2 monitors an estimated temperature of the rotational resistance imparting device 40, instead of monitoring the physical quantity correlated with the temperature of the rotational resistance imparting device 40 in the above-described manner. The temperature of the rotational resistance imparting device 40 can be estimated based on the amount of heat generation and the amount of heat dissipation of the rotational resistance imparting device 40. Note that the amount of heat generation of the rotational resistance imparting device 40 can be estimated based on the rotational speed of the rotation shaft 30, or can be estimated based on the actual traveling of the traveling body 4 (e.g., estimated based on a value obtained by integrating the traveling speed by the traveling distance).

The traveling control portion H1 causes the traveling body 4 to travel from the transfer target location of a transport source to the transfer target location of a transport destination, based on a transport instruction that designates the transport source and the transport destination of the article B. For example, the traveling control portion H1 controls the traveling speed of the traveling body 4 from the start of traveling to the stop of traveling, in accordance with a traveling speed pattern that defines in order: an acceleration period in which accelerate traveling is performed; a constant-speed period in which constant-speed traveling is performed at an upper-limit traveling speed; a deceleration period in which deceleration traveling is performed; and a creeping-speed period in which constant-speed traveling at a creeping speed (creep traveling) is performed. Then, the traveling control portion H1 switches the upper-limit traveling speed of the traveling body 4 according to a result of determination of whether the temperature is in the high-temperature state performed by the temperature monitoring portion H2. Specifically, the traveling control portion H1 sets the upper-limit traveling speed of the traveling body 4 in the high-temperature state to be lower than the upper-limit traveling speed of the traveling body 4 in a normal state (e.g., the rated traveling speed of the traveling body 4).

Although the details are omitted, the control portion H includes a processor such as a microcomputer, as well as a peripheral circuit such as a memory, and these pieces of hardware and a program executed on hardware such as the processor work cooperatively to implement various functions of the control portion H. Although FIG. 1 shows a configuration in which the control portion H is provided in the stacker crane 1, at least a part of the functions of the control portion H may be provided independently of the stacker crane 1 (i.e., in another device capable of communicating with the stacker crane 1).

Alternative Embodiments (1) Although the above-described embodiments have shown examples in which the positions of the rotation axes (P1, P2) of the first roller 18A and the second roller 18B are changed in the lateral direction Y by the first supporting member 19 and the second supporting member 20 being pivoted about the vertical axes (common axis Pc), it is possible to adopt a configuration in which the positions of the rotation axes of the first roller 18A and the second roller 18B are changed in the lateral direction Y by the first supporting member 19 and the second supporting member 20 being translated in the lateral direction Y.

(2) Although the above-described embodiments have shown examples in which one elastic body (coil spring 22) is used as both the first biasing body and the second biasing body, the first biasing body and the second biasing body may be provided separately. In this case, it is preferable that the first adjustment mechanism and the second adjustment mechanism are separately provided so as to correspond to the first biasing body and the second biasing body, respectively.

(3) Although the above-described embodiments have shown examples in which the traveling body 4 includes a pair of front and rear masts 5 arranged in the traveling direction X, the traveling body may include a single mast 5. The upper frame 6 coupled to the upper end of a single mast 5 allows the length in the traveling direction X to be shorter than that in the case where an upper frame is coupled to a pair of masts 5, and thus the first roller 18A and the second roller 18B can be disposed so as to be close to the guide roller 16 in the traveling direction X. Accordingly, the difference between the central position, in the lateral direction Y, of the vertical axes Pg of the pair of guide rollers 16 in the guide unit 11 and the central position, in the lateral direction Y, of the first vertical axis P1 of the first roller 18A and the second vertical axis P2 of the second roller 18B in the braking unit 12 is reduced in the lateral direction Y, which will be relatively advantageous in the case of braking the upper portion of the mast 5 by using the first roller 18A and the second roller 18B.

(4) The first embodiment has shown an example in which the braking force resulting from the rotational resistances of the first roller 18A and the second roller 18B that roll in a state in which they are pressed against the upper rail R2 is exerted on the upper portions of the mast 5. However, the braking unit 12 may be provided with a braking apparatus (ex. one that is similar to the rotational resistance imparting device 40 of the second embodiment) that brakes one or both of the first roller 18A and the second roller 18B, then a control portion that controls the operation of the braking apparatus may perform control to generate a braking torque of the braking apparatus during deceleration of the traveling body 4, and the braking force resulting from the braking torque of the braking apparatus may be exerted on the upper portion of the mast 5 during traveling of the traveling body 4. In this case as well, the first roller 18A and the second roller 18B roll on the upper rail R2 in a state in which they are appropriately pressed against the upper rail R2 from opposite sides, and therefore, the braking force can be generated in a stable manner during traveling. Here, even in the case of providing a braking apparatus, the sway of the mast 5 do not need to be rapidly restricted with a large braking force after the traveling body 4 has stopped, and therefore, it is sufficient that a braking apparatus having a relatively small braking torque is provided.

(5) Although the above-described embodiments have shown exemplary article transport apparatuses in which the traveling body 4 is provided with the traveling motor M1 that drives the traveling body 4, it is possible to adopt a configuration in which the traveling motor M1 is provided in a state in which its position relative to the traveling rail is fixed, including, for example, a state in which the traveling motor M1 is fixed on the floor surface, and the traveling body 4 is driven to travel by coupling the traveling body 4 and the traveling motor M1 by a power transmission mechanism that uses, for example, a belt, a chain, or the like.

(6) In the second embodiment described above, a device that converts the kinetic energy of the rotation shaft 30 into thermal energy is described as an example of the rotational resistance imparting device 40. However, a device that converts the kinetic energy of the rotation shaft 30 into energy (e.g., electric energy) other than thermal energy may be used as the rotational resistance imparting device 40. For example, a device that converts the kinetic energy of the rotation shaft 30 into electric energy using a power generator and stores the power may be used as the rotational resistance imparting device 40 (i.e., a device that exerts a regenerative braking force on the rotation shaft 30). An energy conversion device that recovers the thermal energy generated by the rotational resistance imparting device 40 and converts the thermal energy into another energy (e.g., electric energy) may be provided in the braking unit 12.

Although the invention made by the inventor has been specifically described by way of embodiments, the present invention is not limited to the above-described embodiments, and various modifications may be made without departing from the gist of the invention. In addition, the above-described embodiments may be combined as long as no contradiction arises.

Outline of the Embodiment

The following is a description of an outline of the article transport apparatus described above.

An article transport apparatus includes:

a lower rail installed on a floor surface;

a traveling body configured to be guided by the lower rail and to travel along the lower rail;

a mast provided upright on the traveling body;

an upper frame coupled to an upper end portion of the mast;

an upper rail extending along a traveling direction of the traveling body and configured to guide movement of the upper frame; and an elevating body including a transfer device for transferring an article and configured to move up and down along the mast, the upper frame including at least two guide rollers with positions thereof relative to the upper frame being fixed, the guide rollers being disposed so as to be rotatable about vertical axes and separately on opposite sides of the upper rail as viewed in a vertical direction, and configured to be guided by the upper rail, wherein a first roller and a second roller that are rotatable about vertical axes are disposed opposite to each other with respect to the upper rail in a lateral direction that is orthogonal to the traveling direction as viewed in the vertical direction, a first supporting member configured to rotationally support the first roller is attached in a state in which a position of a rotation axis of the first roller can be changed in the lateral direction and in which the first supporting member is biased by a first biasing body in a direction to push the first roller against the upper rail, and a second supporting member configured to rotationally support the second roller is attached in a state in which a position of a rotation axis of the second roller can be changed in the lateral direction and in which the second supporting member is biased by a second biasing body in a direction to push the second roller against the upper rail.

Since the traveling body travels in a state in which the position of the upper frame is restricted relative to the upper rail by the at least two guide rollers whose rotation axes are attached to the upper frame in a fixed state being guided by the upper rail, the first roller and the second roller that roll on the upper rail at different positions from the two guide rollers in the traveling direction will roll on the upper rail while their positions relative to the upper rail in the lateral direction fluctuate during traveling. Here, possible causes of the changes in the positions of the first roller and the second roller relative to the upper rail in the lateral direction include gaps that can be present between the guide rollers and the upper rail, vibrations of the mast in the lateral direction, manufacturing errors in linearity of the apparatus such as the upper frame and the upper rail, and errors in assembly of the apparatus.

In this respect, according to this configuration, the first roller and the second roller are both attached in a state in which their positions can be changed in the lateral direction and in which they are biased in a direction to be pushed against the upper rail. Therefore, even when the positions, in the lateral direction, of the first roller and the second roller relative to the upper rail fluctuate during traveling of the traveling body, the positions in the lateral direction can be changed such that the first roller and the second roller follow the upper rail, and thereby, the first roller and the second roller roll on the upper rail in a state in which they are appropriately pressed from opposite sides relative to the upper rail. Accordingly, a braking force exerted on the upper portion of the mast, such as a braking force resulting from the rotational resistances of the first roller and the second roller or a braking force resulting from the braking torque in the case of providing a braking apparatus can be generated in a stable manner during traveling. The braking force exerted on the upper portion of the mast during traveling suppresses elastic deformation of the mast in which the mast is tilted in the advancing direction during deceleration of the traveling body, thus making it possible to suppress the sway of the mast after the traveling body has stopped.

Thus, by the traveling body traveling in a state in which the braking force of the first roller and the second roller is generated, it is possible to restrict elastic deformation of the mast in the traveling direction occurring during deceleration, while allowing movement of the upper portion of the mast relative to the upper rail. Since the braking force of the first roller and the second roller is a braking force of a degree which allows movement relative to the upper rail, the braking force of the first roller and the second roller can be smaller than in the case where the sway of the mast is rapidly restricted by a large braking force after the traveling body has stopped.

Accordingly, the support structures for the first roller and the second roller can be simplified. Even in the case of providing a braking apparatus, it is only necessary to provide a braking apparatus having a relatively small braking torque. It is thus possible to achieve an article transport apparatus that can suppress, with a simple configuration, the sway of the mast after stoppage of the traveling body.

Here, it is preferable that pressing forces of the first roller and the second roller to the upper rail are set to be greater than an allowable pressing force of the at least two guide rollers to the upper rail.

With this configuration, it is possible to obtain an appropriate braking force resulting from the rotational resistances of the first roller and the second roller during traveling of the traveling body, making it possible to actively use the rotational resistances of the first roller and the second roller to restrict the sway of the upper portion of the mast during traveling. Note that the allowable pressing force of the guide rollers to the upper rail may be set taking into consideration the supporting strength, the traveling resistance, and the like of the guide rollers.

It is preferable that a first adjustment mechanism for adjusting a biasing force of the first biasing body and a second adjustment mechanism for adjusting a biasing force of the second biasing body are provided.

With this configuration, the pressing forces of the first roller and the second roller to the upper rail can be separately adjusted, and therefore, the rotational resistances of the first roller and the second roller or the braking torques generated by the first roller and the second roller in the case of providing a braking apparatus can be separately adjusted. Accordingly, the braking force to the upper portion of the mast that is generated during traveling of the traveling body can be adjusted to an appropriate magnitude according to, for example, the natural frequency of the article transport apparatus that differs depending on the overall length of the mast or the object to be transported, or the traveling capacity (e.g., acceleration and deceleration) of the traveling body.

It is preferable that the first supporting member is supported by the upper frame so as to be pivotable about a first pivot axis extending along the vertical direction, the second supporting member is supported by the upper frame so as to be pivotable about a second pivot axis extending along the vertical direction, the first pivot axis and the second pivot axis are disposed at the same position in the traveling direction, and the first roller and the second roller are disposed at the same position in the traveling direction.

With this configuration, the first roller and the second roller are disposed at the same position in the traveling direction, and the first pivot axis and the second pivot axis are disposed at the same position in the traveling direction, and thereby, the device for applying a braking force to the upper portion of the mast can be configured compact in the traveling direction. Further, as a result of the first roller and the second roller sandwiching the upper rail at the same position in the traveling direction, the first roller and the second roller can be appropriately pushed against the upper rail.

It is preferable that the first pivot axis and the second pivot axis are a common axis located on a virtual center line forming a center, in the lateral direction, of the upper rail as viewed in the vertical direction, an elastic body serving as the first biasing body and the second biasing body is disposed in a compressed state between a first force point in the first supporting member and a second force point in the second supporting member, the first force point being located on the same side as the first roller with respect to the virtual center line in the lateral direction and opposite to the first roller with respect to the common axis in the traveling direction, and the second force point being located on the same side as the second roller with respect to the virtual center line in the lateral direction and opposite to the second roller with respect to the common axis in the traveling direction, and a distance from the common axis to the first force point in the traveling direction and a distance from the common axis to the second force point in the traveling direction are equal, and a distance from the common axis to the rotation axis of the first roller and a distance from the common axis to the rotation axis of the second roller are equal as viewed in the vertical direction.

With this configuration, a biasing force having the same magnitude is exerted on the first force point and the second force point by the elastic body serving as the first biasing body and the second biasing body. Then, the first force point and the rotation axis of the first roller in the first supporting member and the second force point and the rotation axis of the second roller in the second supporting member are disposed symmetrically with respect to the virtual center line forming the center, in the lateral direction, of the upper rail. Moreover, the first supporting member and the second supporting member pivot about the common axis located on the virtual center line. Accordingly, the first roller and the second roller are pushed against the upper rail in a well-balanced manner, and it is therefore possible to appropriately obtain a braking force to the upper portion of the mast that is generated during traveling of the traveling body.

Preferably, a rotational resistance imparting device that imparts a rotational resistance is provided on a rotation shaft of at least one of the first roller and the second roller.

With this configuration, the pressing force of the first roller and the second roller against the upper rail, which is required to achieve the desired amount of the braking force with the rotational resistance provided by the first roller and the second roller, can be suppressed to be smaller by an amount of the rotational resistance of at least one of the first roller and the second roller that has been increased by the rotational resistance imparting device. As a result, the weight of a device that applies a braking force to the upper portion of the mast can be reduced by reducing the size of the first biasing body and the second biasing body and simplifying the support structure for the first roller and the second roller, and also the service life of that device can be increased by suppressing a decrease in service life of the various parts.

Preferably, the rotational resistance imparting device is a device that converts kinetic energy of the rotation shaft into thermal energy.

With this configuration, it is possible to simplify the configuration of the rotational resistance imparting device as compared with when the rotational resistance imparting device converts the kinetic energy of the rotation shaft into another energy (e.g., electric energy). Accordingly, it is possible to reduce the weight of a device that applies a braking force to the upper portion of the mast, and reduce the cost of the device.

Preferably, the article transport apparatus further includes a control portion that controls traveling operation of the traveling body, wherein the control portion monitors a temperature of the rotational resistance imparting device, and, if it is determined that the temperature of the rotational resistance imparting device is in a high-temperature state exceeding a predetermined threshold, limits an upper-limit traveling speed of the traveling body to be lower than the upper-limit traveling speed of the traveling body in a normal state that is not the high-temperature state.

With this configuration, it is possible to suppress a further increase in the temperature of the rotational resistance imparting device in a situation in which the temperature of the rotational resistance imparting device exceeds a predetermined threshold. Accordingly, it is possible to avoid an excessive increase in the temperature of the rotational resistance imparting device, thus suppressing the durability and the performance of the parts constituting the rotational resistance imparting device from being reduced by heat.

It is sufficient that the article transport apparatus according to the present disclosure can achieve at least one of the above-described effects.

DESCRIPTION OF REFERENCE SIGNS

4: Traveling body
5: Mast
6: Upper frame
7: Elevating body
8: Transfer device
16: Guide roller
18A: First roller 18B: Second roller
19: First supporting member
20: Second supporting member
21: Virtual center line
22: Coil spring (elastic body, first biasing body, second biasing body)
23: Bolt
26b: Double nut (first adjustment mechanism, second adjustment mechanism)
30: Rotation shaft
40: Rotational resistance imparting device
B: Article
D1: Distance from common axis to rotation axis of first roller
D2: Distance from common axis to rotation axis of second roller
L1: Distance from common axis to first force point in traveling direction
L2: Distance from common axis to second force point in traveling direction
P1: First vertical axis (rotation axis of first roller)
P2: Second vertical axis (rotation axis of second roller)
Pc: Common axis (first pivot axis, second pivot axis)
R1: Lower rail
R2: Upper rail
T1: First force point
T2: Second force point
X: Traveling direction
Y: Lateral direction
Z: Vertical direction

The invention claimed is:

1. An article transport apparatus comprising:
a lower rail installed on a floor surface;
a traveling body configured to be guided by the lower rail and to travel along the lower rail;
a mast provided upright on the traveling body; an upper frame coupled to an upper end portion of the mast;
an upper rail extending along a traveling direction of the traveling body and configured to guide movement of the upper frame; and
an elevating body including a transfer device for transferring an article and configured to move up and down along the mast,
wherein:
the upper frame includes at least two guide rollers with positions thereof relative to the upper frame being fixed, the guide rollers being disposed so as to be rotatable about vertical axes and separately on opposite sides of the upper rail as viewed in a vertical direction, and configured to be guided by the upper rail,
a first roller and a second roller that are rotatable about vertical axes are disposed opposite to each other with respect to the upper rail in a lateral direction that is orthogonal to the traveling direction as viewed in the vertical direction,
a first supporting member configured to rotationally support the first roller is attached in a state in which a position of a rotation axis of the first roller can be changed in the lateral direction and in which the first supporting member is biased by an elastic body in a direction to push the first roller against the upper rail,
a second supporting member configured to rotationally support the second roller is attached in a state in which a position of a rotation axis of the second roller can be changed in the lateral direction and in which the second supporting member is biased by the elastic body in a direction to push the second roller against the upper rail,
the first supporting member is supported by the upper frame so as to be pivotable about a first pivot axis extending along the vertical direction,
the second supporting member is supported by the upper frame so as to be pivotable about a second pivot axis extending along the vertical direction,
the first pivot axis and the second pivot axis are disposed at the same position in the traveling direction,
the first roller and the second roller are disposed at the same position in the traveling direction,
the first pivot axis and the second pivot axis are a common axis located on a virtual center line forming a center, in the lateral direction, of the upper rail as viewed in the vertical direction, and
the elastic body is disposed in a compressed state between a first force point in the first supporting member and a second force point in the second supporting member, the first force point being located on the same side as the first roller with respect to the virtual center line in the lateral direction and opposite to the first roller with respect to the common axis in the traveling direction, and the second force point being located on the same side as the second roller with respect to the virtual center line in the lateral direction and opposite to the second roller with respect to the common axis in the traveling direction.

2. The article transport apparatus according to claim 1, wherein pressing forces of the first roller and the second roller to the upper rail are set to be greater than an allowable pressing force of the at least two guide rollers to the upper rail.

3. The article transport apparatus according to claim 2, wherein an adjustment mechanism for adjusting a biasing force of the elastic body is provided.

4. The article transport apparatus according to claim 2, wherein a rotational resistance imparting device that imparts a rotational resistance is provided on a rotation shaft of at least one of the first roller and the second roller.

5. The article transport apparatus according to claim 1, wherein an adjustment mechanism for adjusting a biasing force of the elastic body is provided.

6. The article transport apparatus according to claim 5, wherein a rotational resistance imparting device that imparts a rotational resistance is provided on a rotation shaft of at least one of the first roller and the second roller.

7. The article transport apparatus according to claim 1, wherein:
a distance from the common axis to the first force point in the traveling direction and a distance from the common axis to the second force point in the traveling direction are equal, and a distance from the common axis to the rotation axis of the first roller and a distance from the common axis to the rotation axis of the second roller are equal as viewed in the vertical direction.

8. The article transport apparatus according to claim 7, wherein a rotational resistance imparting device that imparts a rotational resistance is provided on a rotation shaft of at least one of the first roller and the second roller.

9. The article transport apparatus according to claim 1, wherein a rotational resistance imparting device that imparts a rotational resistance is provided on a rotation shaft of at least one of the first roller and the second roller.

10. The article transport apparatus according to claim 9, wherein the rotational resistance imparting device is a device that converts kinetic energy of the rotation shaft into thermal energy.

11. An article transport apparatus comprising:

a lower rail installed on a floor surface;

a traveling body configured to be guided by the lower rail and to travel along the lower rail;

a mast provided upright on the traveling body;

an upper frame coupled to an upper end portion of the mast;

an upper rail extending along a traveling direction of the traveling body and configured to guide movement of the upper frame;

an elevating body including a transfer device for transferring an article and configured to move up and down along the mast; and a control portion that controls traveling operation of the traveling body wherein:

the upper frame includes at least two guide rollers with positions thereof relative to the upper frame being fixed, the guide rollers being disposed so as to be rotatable about vertical axes and separately on opposite sides of the upper rail as viewed in a vertical direction, and configured to be guided by the upper rail, a first roller and a second roller that are rotatable about vertical axes are disposed opposite to each other with respect to the upper rail in a lateral direction that is orthogonal to the traveling direction as viewed in the vertical direction, a first supporting member configured to rotationally support the first roller is attached in a state in which a position of a rotation axis of the first roller can be changed in the lateral direction and in which the first supporting member is biased by an elastic body in a direction to push the first roller against the upper rail, a second supporting member configured to rotationally support the second roller is attached in a state in which a position of a rotation axis of the second roller can be changed in the lateral direction and in which the second supporting member is biased by the elastic body in a direction to push the second roller against the upper rail a rotational resistance imparting device that imparts a rotational resistance is provided on a rotation shaft of at least one of the first roller and the second roller, the rotational resistance imparting device is a device that converts kinetic energy of the rotation shaft into thermal energy, and the control portion monitors a temperature of the rotational resistance imparting device, and, if it is determined that the temperature of the rotational resistance imparting device is in a high-temperature state exceeding a predetermined threshold, limits an upper-limit traveling speed of the traveling body to be lower than the upper-limit traveling speed of the traveling body in a normal state that is not the high-temperature state.

* * * * *